(12) United States Patent
Shim et al.

(10) Patent No.: US 10,361,462 B2
(45) Date of Patent: Jul. 23, 2019

(54) ELECTROLYTE COMPOSITION OF LEAD STORAGE BATTERY AND LEAD STORAGE BATTERY USING THE SAME

(71) Applicant: HYUNDAI MOTOR COMPANY, Seoul (KR)

(72) Inventors: Jin Yong Shim, Asan-si (KR); Jun Hyeong Park, Seo-gu (KR); Jae Eun Jin, Incheon (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/376,585

(22) Filed: Dec. 12, 2016

(65) Prior Publication Data

US 2018/0108948 A1   Apr. 19, 2018

(30) Foreign Application Priority Data

Oct. 14, 2016   (KR) .................. 10-2016-0133687

(51) Int. Cl.
*H01M 10/08* (2006.01)

(52) U.S. Cl.
CPC ........ *H01M 10/08* (2013.01); *H01M 2220/20* (2013.01); *H01M 2300/0011* (2013.01); *Y02E 60/126* (2013.01); *Y02P 70/54* (2015.11)

(58) Field of Classification Search
CPC ......... H01M 10/08; H01M 2300/0011; H01M 2220/20
See application file for complete search history.

(56) References Cited

U.S. PATENT DOCUMENTS

| | | | | |
|---|---|---|---|---|
| 5,474,863 A | * | 12/1995 | Yamamoto | H01M 4/62 425/215 |
| 2007/0190426 A1 | * | 8/2007 | Matsunami | H01M 2/166 429/250 |
| 2015/0280286 A1 | * | 10/2015 | Wu | H01M 10/08 429/204 |

FOREIGN PATENT DOCUMENTS

| | | | |
|---|---|---|---|
| EP | 1429401 | 6/2008 | |
| JP | 1995094206 A | 4/1995 | |
| JP | 1996069786 A | 3/1996 | |
| JP | H 0883622 A | 3/1996 | |
| JP | 2000-149981 | * 5/2000 | ........... H01M 10/08 |
| JP | 2001102027 A | 4/2001 | |
| JP | 2005203318 A | 7/2005 | |
| KR | 10-0609693 B1 | 8/2006 | |
| KR | 10-0627037 | 9/2006 | |
| KR | 1020130130751 A | 12/2013 | |

(Continued)

*Primary Examiner* — Osei K Amponsah
(74) *Attorney, Agent, or Firm* — McDonnell Boehnen Hulbert & Berghoff LLP

(57) ABSTRACT

An electrolyte composition for a lead storage battery and a lead storage battery using the same are provided. More particularly, the electrolyte composition of a lead storage battery and the lead storage battery using the same improve stratification of an electrolyte without use of a separate mechanical device by using a natural stirring effect caused by a specific gravity difference between a dispersant having a specific gravity of from about 1.02 to about 1.35 and an electrolyte including distilled water and sulfuric acid. Due to the reduction in mechanical components, the electrolyte composition for a lead storage battery and a lead storage battery disclosed herein have enhanced durability compared to conventional batteries.

7 Claims, 6 Drawing Sheets

(56) References Cited

FOREIGN PATENT DOCUMENTS

KR    1020140021663    2/2014

* cited by examiner

| CLASSIFICATION | COMPARATIVE EXAMPLE (EXISTING PRODUCT) | EXAMPLE 7 | EXAMPLE 8 |
|---|---|---|---|
| UPPER PORTION |  |  |  |
| LOWER PORTION |  |  |  |
| RESULT | $PbSO_4$ CONTENT OF LOWER PORTION OF POLE PLATE IS LARGE | $PbSO_4$ CONTENT OF LOWER PORTION OF POLE PLATE IS SMALL | $PbSO_4$ CONTENT OF LOWER PORTION OF POLE PLATE IS SMALL |

ELECTROLYTE COMPOSITION OF LEAD STORAGE BATTERY AND LEAD STORAGE BATTERY USING THE SAME

CROSS-REFERENCE TO RELATED APPLICATION

This application claims, pursuant to 35 U.S.C. § 119(a), priority to and benefit of Korean Patent Application No. 10-2016-0133687 filed on Oct. 14, 2016, the entire contents of which are incorporated herein by reference.

BACKGROUND

(a) Technical Field

The present disclosure relates to an electrolyte composition for a lead storage battery and a lead storage battery using the same. More particularly, it relates to an electrolyte composition for a lead storage battery and a lead storage battery using the same which improve stratification of an electrolyte without use of a separate mechanical device by using a natural stirring effect caused by a specific gravity difference between a dispersant having a specific gravity of from about 1.02 to about 1.35 and an electrolyte including distilled water and sulfuric acid. Due to the reduction in mechanical components, the electrolyte composition for a lead storage battery and a lead storage battery disclosed herein have enhanced durability compared to conventional batteries.

(b) Background

A conventional lead storage battery for a vehicle is used for starting, lighting, and ignition ("SLI"). Recently, due to a need for increased fuel efficiency, various technologies have been developed, including: (i) a charge control system (power generation control) suppressing a generation quantity of an idling stop & go ("ISG") system and of an alternator and improving engine efficiency or (ii) a regenerative braking system converting kinetic energy into electric energy during deceleration of the vehicle to accumulate the energy. Particularly, in a lead storage battery in the ISG, deep discharging and frequent charging occur and the battery is typically in a partial state of charge ("PSOC") (i.e not), and therefore the charge quantity of the battery is decreased compared with a vehicle in a conventional non-ISG system.

A charge reaction in the conventional lead storage battery is a reaction by which $PbSO_4$, which is a discharge product of a positive electrode and a negative electrode, is restored to $PbO_2$ and Pb and a large amount of sulfate is released into an electrolyte (sulfuric acid) for each electrode pole plate in this process. Because the release velocity of the sulfate is lower than the diffusion velocity, a large amount of sulfate accumulates on the surface of the electrode pole plate and gravity causes the sulfate molecules to precipitate downwards. As a result, a phenomenon known as stratification occurs, where the sulfate ion concentration in the lower electrolyte is increased, and the concentration of sulfate ions in the upper electrolyte is decreased.

Stratification results in lower reactivity of the positive electrode and the negative electrode, accumulation of $PbSO_4$ (sulfation) on the lower portions of the electrodes and degradation of the surface properties, and deterioration of charge solubility. While the phenomenon is left, charging and discharging reaction is repeated and battery capacity is rapidly decreased resulting in an early end of battery lifespan.

Accordingly, in order to suppress the electrolyte stratification in a lead storage battery, new technologies capable of continuously circulating sulfate ions to maintain a uniform distribution rather than having the sulfate ions settle downwards is required.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present disclosure has been made in an effort to solve the above-described problems associated with prior art.

The present disclosure provides an electrolyte composition for a lead storage battery and a lead storage battery using the same which improve stratification of an electrolyte without use of a separate mechanical device by using a natural stirring effect caused by a specific gravity difference between a dispersant having a specific gravity of from about 1.02 to about 1.35 and an electrolyte including distilled water and sulfuric acid. Due to the reduction in mechanical components, the electrolyte composition for a lead storage battery and a lead storage battery disclosed herein have enhanced durability and life span compared to conventional batteries. Embodiments of the electrolyte composition disclosed herein may lead to a doubling of battery lifespan.

An object of the present disclosure is to provide an electrolyte composition for a lead storage battery which improves battery durability by reducing electrolyte stratification.

Another object of the present disclosure is to provide a lead storage battery using the electrolyte composition.

In an example embodiment, the present disclosure provides an electrolyte composition for a lead storage battery including distilled water, sulfuric acid, and a dispersant having a specific gravity of 1.02 to 1.35. The dispersant is a mixture of a filler and either glass bubbles or one or more polymer resins selected from a group consisting of polypropylene, polyvinyl chloride and polyethylene.

In another example embodiment, the present invention provides a lead storage battery using the electrolyte composition.

Using the electrolyte composition disclosed herein, it is also possible to reduce the number of insurance claims and the cost of those claims due to initial start failure of a field battery by improving durability of the battery.

It is also possible to reduce battery manufacturing costs by replacing an expensive absorbent glass mat (AGM) battery used in a power generation control system vehicle.

Use of the disclosed electrolyte composition does not require modification to the layout of the vehicle. Battery weight also need not increase when the disclosed electrolyte composition is used.

Other aspects and preferred embodiments of the invention are discussed below.

BRIEF DESCRIPTION OF THE DRAWINGS

The above and other features of the present invention will now be described in detail with reference to certain example embodiments thereof illustrated in the accompanying drawings which are given by way of illustration only, and thus are not limitative of the present invention.

Figure 1:
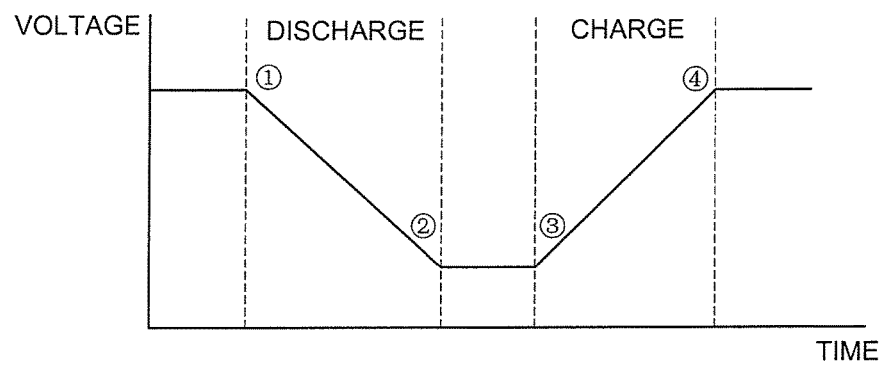
FIG. 1 is a graph illustrating a change in specific gravity of an electrolyte as a conventional lead storage battery is charged and discharged.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments, examples of which are illustrated in the accompanying drawings and described below. It should be understood that present description is not intended to limit the invention to those example embodiments. On the contrary, the invention is intended to cover not only the example embodiments, but also various alternatives, modifications, equivalents and other embodiments, which may be included within the spirit and scope of the invention as defined by the appended claims.

It is understood that the term "vehicle" or "vehicular" or other similar terms as used herein is inclusive of motor vehicles in general such as passenger automobiles including sports utility vehicles ("SUV"), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter, the present invention will be described in more detail as one example embodiment.

Stratification of a lead storage battery is a phenomenon in which sulfate ions ($SO_4^-$) having a higher specific gravity than water ($OH^-$) settle at the lower portion of the battery due to gravity, causing a deviation in specific gravity between the upper and lower portions of an electrolyte. Before the stratification occurs, the upper and lower portions of the battery maintain a uniform specific gravity. Upon stratification, the upper portion of the electrolyte has a low specific gravity and the lower portion has a high specific gravity.

When the concentration of sulfuric acid increases at the lower portion of the battery, the discharge reaction is non-uniform between the upper and lower portions, i.e., reactivity in the lower portion is higher than reactivity in the upper portion. As a result, a larger quantity of reaction product ($PbSO_4$) is generated at the lower portion as compared with the upper portion. The large quantity of $PbSO_4$ generated at the lower portion is not restored to the original active material (positive electrode: $PbO_2$, and negative electrode: Pb) state, but is instead accumulated during charging. The lower portion of the electrode is covered with a large amount of $PbSO_4$, reducing the reaction-specific surface area and deactivating the lower portion of the electrode during the charge and discharge.

The reduction of the reaction specific surface area causes the reduction of battery capacity and as a result, battery life is reduced.

FIG. 1 is a graph illustrating a change in specific gravity of an electrolyte in a conventional lead storage battery during charging and discharging. In the graph of FIG. 1, the specific gravity of the electrolyte of the lead storage battery for each step was measured and recorded in Table 1 below.

TABLE 1

| Classification | Change in specific gravity of electrolyte for each step | | | |
|---|---|---|---|---|
| | ① | ② | ③ | ④ |
| Upper portion | 1.280 | 1.185 | 1.187 | 1.252 |
| Lower portion | 1.280 | 1.192 | 1.215 | 1.342 |
| Deviation between upper and lower portions | 0 | 0.007 | 0.028 | 0.127 |

As seen in Table 1, while the battery performs a charge/discharge reaction, in steps ① and ②, which are the discharging process, the change in specific gravity for each position (upper/lower portions) of the battery is minimal. However, in steps ③ and ④, which are the charging process, the deviation in specific gravity (the progression degree of stratification) between the upper and lower portions of the battery increases. These results suggest that to avoid the negative effects of electrolyte stratification, a device for stirring the electrolyte is desirable.

During the charge/discharge cycle of the lead storage battery, the the following active material conversions occur:

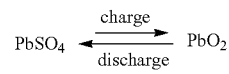

The present disclosure relates to a technique of reducing deviation in specific gravity between the upper and lower portions of the electrolyte using a natural stirring principle arising from use of an acid-resistant powder dispersant having an appropriate specific gravity in order to suppress electrolyte stratification in the lead storage battery.

Particularly, the present disclosure provides a method of naturally suppressing electrolyte stratification without use of a separate mechanical device by generating a deviation in specific gravity along the height of the electrolyte during the operation of the lead storage battery. To compensate for the specific gravity deviation arising in step ④, which is the charging process for the conventional lead storage battery, a dispersant having a specific gravity of about 1.25 is added to the electrolyte and then settled at the lower portion of the electrolyte up to step ③. Thereafter, when the specific gravity of the lower electrolyte increases above 1.25, the settled dispersant floats upwards, stirring the electrolyte and reducing the specific gravity deviation between the upper and lower portions of the electrolyte.

The present disclosure provides an electrolyte composition for a lead storage battery including distilled water, sulfuric acid, and a dispersant having a specific gravity of 1.02 to 1.35, in which the dispersant is a mixture of a filler and either glass bubbles or one or more polymer resins selected from a group consisting of polypropylene, polyvinyl chloride and polyethylene.

Because the polymer such as polypropylene, polyvinyl chloride or polyethylene which is used for the dispersant has a specific gravity of 0.9 to 1, in order to meet the specific gravity requirement for example embodiment of the dispersant, a filler is mixed with the polymer resin. When the filler is mixed with the resin, the specific gravity of the mixture is increased and may be adjusted to a desired specific gravity of the dispersant. The filler may be talc, mica, or a mixture thereof.

The mixture may be obtained by mixing the polymer resin and the filler with a weight ratio of from about 55:45 to about 95:5. When the mixture deviates from these ratios, the specific gravity of the mixture is not within the required for the dispersant. It should, however, be noted that other fillers and other weight ratios may be used, so long as the resulting mixture has an appropriate specific gravity.

The resin and filler mixture is finely chopped to a desired size and a desired diameter by freezing he mixture with nitrogen gas and chopping the frozen mixture to a spherical powder form, after mixing the respective components at an appropriate content ratio. Alternatively, a raw material is extracted in a thin wire form to be prepared in a plate-like, cylindrical, or tetrahedral powder form by finely chopping the wire.

The glass bubbles having a specific gravity of 1.02 to 1.35 may be prepared by the following method using glass fiber having a specific gravity of 2 or more. In detail, the glass bubbles may be prepared by high-pressure spraying a hot-melted glass material at a low temperature. The size of the glass bubbles may be adjusted by adjusting the spray pressure and temperature. Alternatively, glass bubbles having a desired target specific gravity may be prepared by adjusting the amount of air in the glass bubbles.

In an example embodiment, the electrolyte composition may include 30 to 65 wt % of distilled water, 34.9 to 40 wt % of sulfuric acid ($H_2SO_4$), and 0.1 to 30 wt % of dispersant. When the dispersant content is less than 0.1 wt %, the electrolyte stirring effect is low, and when the dispersant content is greater than 30 wt %, the electrolyte stirring effect is reduced by interference between the dispersant particles.

In an example embodiment, the dispersant may be formed in a powder shape selected from a group consisting of a spherical shape, a plate-like shape, a cylindrical shape, and a tetrahedral shape. The average dispersant particle size is from about 1 μm to about 20 mm. When the average particle size is less than 1 μm, even though the specific gravity of the particle is larger than the specific gravity of the electrolyte, the particles do not settled downwards, but instead continuously float upwards due to a buoyancy effect. In contrast, when the average dispersant particle size is greater than 20 mm, the particle size is larger than the space available for particle movement, and thus the electrolyte is not stirred.

In this example, the dispersant may have a specific gravity of 1.02 to 1.35. When the specific gravity is less than 1.02, the dispersant particles do not settle to the lower portion of the electrolyte, and when the specific gravity is greater than 1.35, particles do not rise to the upper portion of the electrolyte, but are continuously settled at the lower portion of the electrolyte. In these situations, the electrolyte stirring effect does not occur.

According to an example embodiment of the present invention, the dispersant may comprise two dispersants having different specific gravities. When the lead storage battery is charged, the electrolyte stratification is gradually generated over the electrolyte. When using two dispersants having different specific gravities, in the early stage of stratification, the dispersant having the lower specific gravity floats in the electrolyte and the dispersant having the higher specific gravity settles at the lower portion of the electrolyte. Thereafter, as the specific gravity of the electrolyte alters during stratification, the dispersant having the lower specific gravity and the dispersant having the higher specific gravity are complementarily stirred, and thus there may be an even larger electrolyte stirring effect than when using a single dispersant having a single specific gravity.

In this example embodiment, the two dispersants having different specific gravities may include a first dispersant having a specific gravity of 1.02 to 1.27 and a second dispersant having a specific gravity of 1.271 to 1.35. The dispersant having the lower specific gravity of 1.02 to 1.27 serves to suppress stratification by causing stirring in the early stage of stratification. Further, the dispersant having the higher specific gravity of 1.271 to 1.35 serves to suppress stratification by causing stirring in the later stage of stratification. For this reason, use of two dispersants having different specific gravities is preferred to use of a single dispersant having a specific gravity of 1.02 to 1.35 alone. In a spate example embodiment, the two different dispersants may include a first dispersant having a specific gravity of 1.02 to 1.27 and a second dispersant having a specific gravity of 1.271 to 1.35 mixed in a weight ratio of 1:1.

According to an example embodiment, in the electrolyte composition for the lead storage battery, during the charge/discharge process, the specific gravity is repeatedly changed according to the position in the electrolyte. To correct for this behavior, an acid-resistant, particulate powder type dispersant having an appropriate specific gravity and a characteristic shape may be added to the electrolyte in a specific optimal amount.

The dispersant particles move in a vertical direction due to changes in the specific gravity of the electrolyte during the charge/discharge process, facilitating circulation of the sulfate ions ($SO_4^{2-}$) in the electrolyte rather than accumulation of sulfate ions at the lower portion of the electrolyte. That is, generating a density difference between the upper and lower portions of the electrolyte creates a stirring effect that suppresses electrolyte stratification.

The present disclosure also provides a lead storage battery using the disclosed electrolyte composition.

Figure 2:
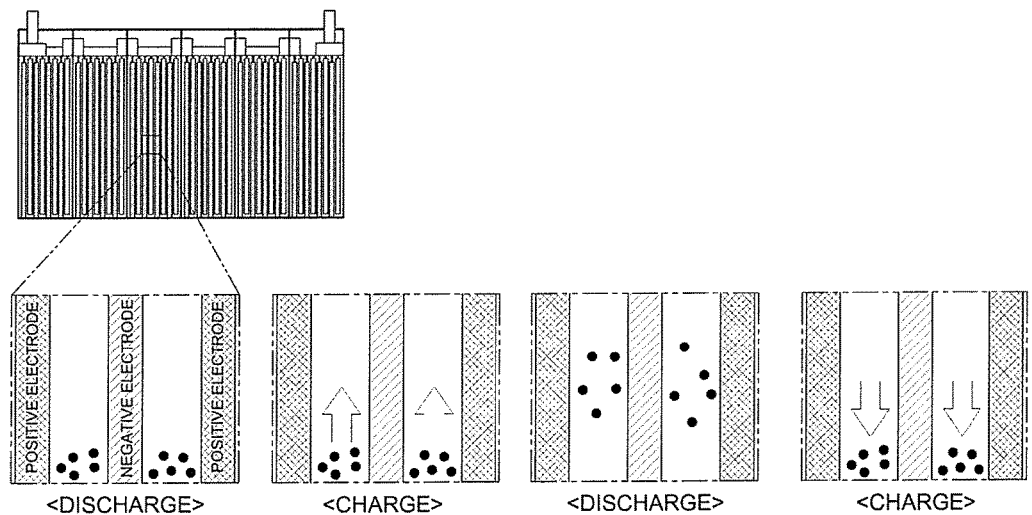
FIG. 2 is a diagram illustrating a change in specific gravity of an electrolyte as an example embodiment of a lead storage battery according to the present disclosure is charged and discharged.

FIG. 2 is a diagram illustrating a change in specific gravity of an electrolyte during charging and discharging an example embodiment of a lead storage battery. In FIG. 2, during an initial discharge, the deviation in specific gravity between the upper and lower portions of the electrolyte is minimal. When the charge is completed, the specific gravity of the dispersant is lower than the specific gravity of the lower portion of the electrolyte and the dispersant particles are lifted upwards. The lifted dispersant particles circulate the electrolyte and reduce the deviation in specific gravity between the upper and lower portions of the electrolyte, and the $SO_4^{2-}$ ions concentrated at the lower portion of the electrolyte are also transported upwards. Then, when the discharge occurs, the deviation in specific gravity between the upper and lower portions of the electrolyte is reduced as the dispersant particles settle to the lower portion again.

According to the present disclosure, the electrolyte composition for the lead storage battery can improve durability and battery life compared with conventional batteries by about two times or more by improving stratification. Preferably, the durability may be improved by about 2.7 times based on durability cycle performance evaluation.

It is also possible to reduce the number of insurance claims and the costs of those claim costs due to initial start failure of a field battery by improving battery durability. For example, when the claim rate is improved by 80%, the claim costs may be reduced by about 4 billion won/year. As used herein, the term "field" describes use of a battery in a vehicle that is generally mass-produced and purchased and operated by consumers, i.e. a field battery means a battery which is installed on a vehicle that is sold and travels on the street. In a conventional field battery, lack of battery durability due to electrolyte stratification may result in frequent start failure while traveling and associated consumer complaints. Using the electrolyte composition of the present disclosure, the complaints and the complaint costs may be reduced by improving the durability of the field battery.

It is also possible to reduce costs by replacing an expensive absorbent glass mat (AGM) battery which has been used in a power generation control system vehicle. For example, if the cost of an AGM battery is 15,000 won unit, battery costs may be reduced by about 45 billion won for 3 million units.

When a battery having the electrolyte composition disclosed herein is sued, modification of the vehicle layout is not necessary. Moreover, the battery weight is the same as in conventional batteries.

Hereinafter, the example embodiments are described in more detail based on Examples.

TEST EXAMPLES

The following examples illustrate the invention and are not intended to limit the same.

Test Example 1: Evaluation of Influence of Discharge Reaction on Stratification

In order to assess the change in specific gravity between the upper and lower portions of the electrolyte of a conventional lead storage battery according to an amplitude of dark current and a period when the dark current is discharged, a lead storage battery in the related art was prepared and then a test was performed under the following test condition. Particularly, in ① natural discharge (0 mA), ② 11 mA (a dark current shutoff device ON condition), and ③ 22 mA (a dark current shutoff device OFF condition) states of the dark current, specific gravities at the upper and lower portions were measured. Further, a difference in the measured specific gravities at the upper and lower portions of the battery was illustrated by a graph. The results are illustrated in FIGS. 3 and 4.

Figure 3:
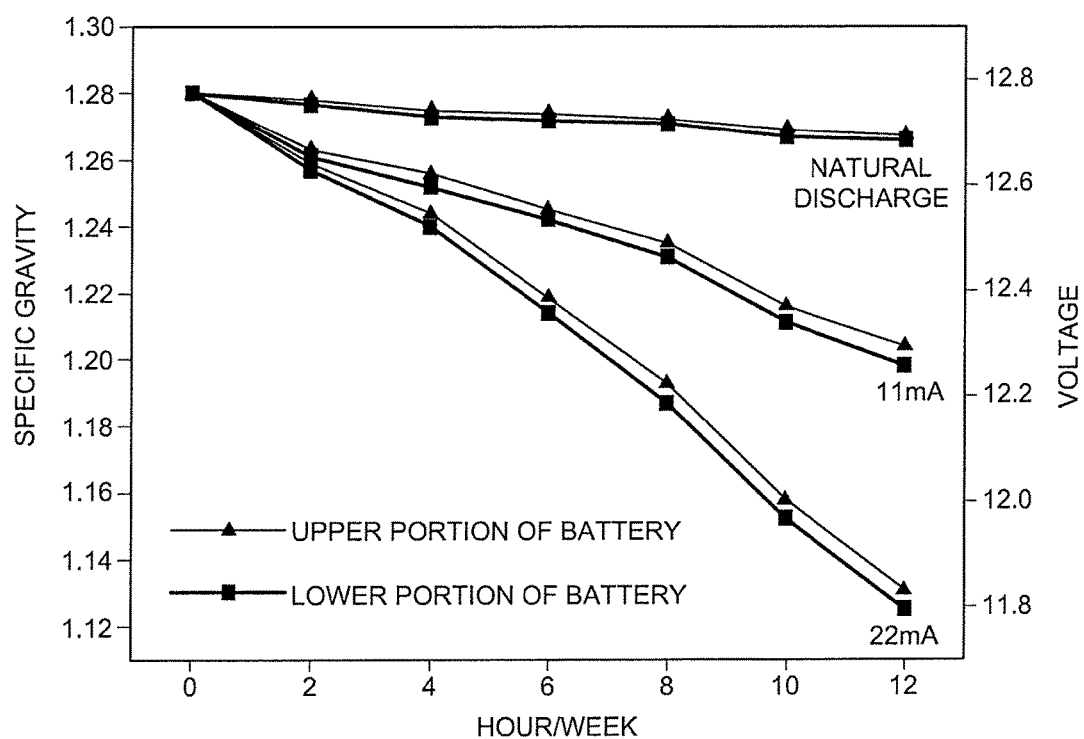
FIG. 3 is a graph illustrating a change in specific gravity between upper and lower portions of an electrolyte of the lead storage battery of Test Example 1.

FIG. 3 is a graph illustrating a change in specific gravity between the upper and lower portions of the electrolyte of a lead storage battery according to amplitude of dark current and a time in Test Example 1 of the present invention. FIG. 4 is a graph illustrating a deviation in specific gravity between the upper and lower portions of the electrolyte of a lead storage battery according to amplitude of dark current and a time in Test Example 1.

Figure 4:
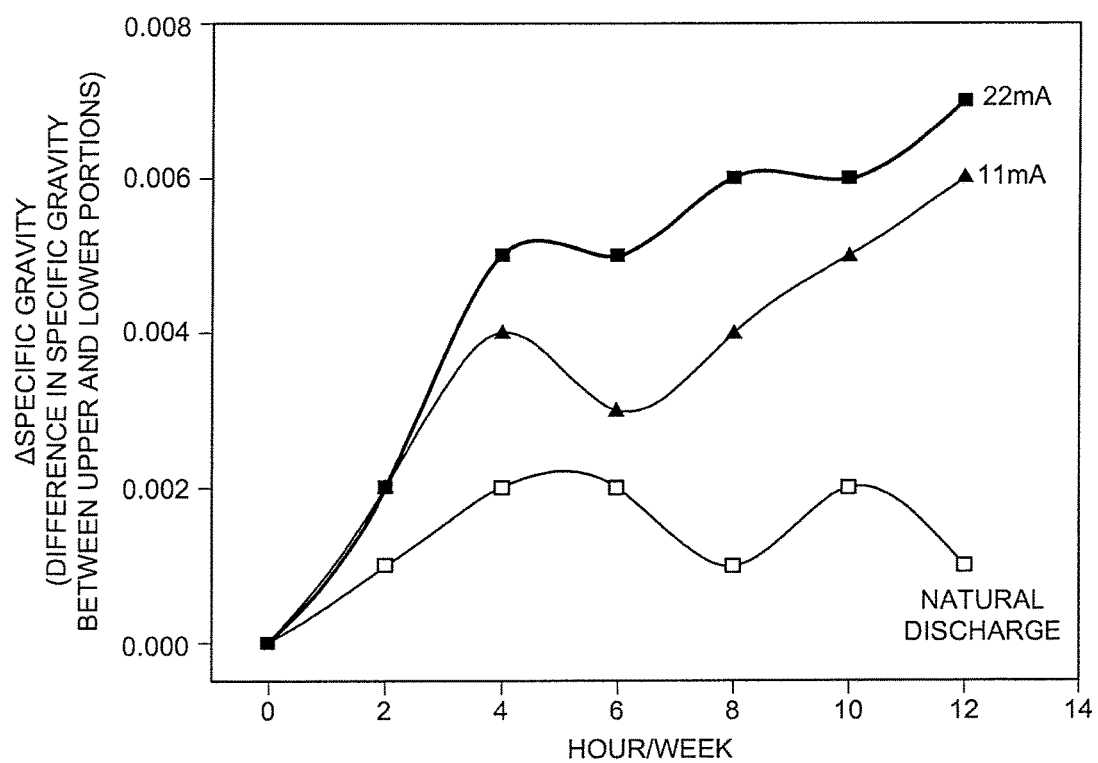
FIG. 4 is a graph illustrating a deviation in specific gravity between the upper and lower portions of the electrolyte of the lead storage battery of Test Example 1.

In FIGS. 3 and 4, it was observed that as the amplitude of the dark current was increased, a reduction width of the specific gravity over time was slightly large. Particularly as the amplitude of the dark current increased, the discharge amount was increased, but the deviation in specific gravity between the upper and lower portions of the electrolyte of the lead storage battery was low. Also, when the dark current shutoff device was on, in the case of small current, the stratification effect was relatively low.

As a result, it can be seen that an increase width in specific gravity according to a period compared with natural discharge when the dark current was applied was a little increased. In other words, it was observed that as the discharge amount increased, stratification over time slightly accelerated.

Test Example 2: Evaluation of Influence of Charge/Discharge Reaction on Stratification In order to evaluate influence of the charge/discharge reaction on stratification in a lead storage battery, a change in specific gravity of the electrolyte for each charge/discharge progression step of the lead storage battery was analyzed using the following test conditions. In detail, in a lead storage battery in the related art, the specific gravity of the electrolyte was measured for each step of discharge (13.6 A, 20 hr)→left (10 hr)→charge (13.6 A, 24 hr)→left (10 hr)→discharge (13.6 A, 20 hr). In this case, the charge/discharge process was performed under 13.6 A: $4*I_{20}$ ($I_{20}$=3.4 A, 68 Ah based 20 time rate discharge current) condition. The results are illustrated in FIGS. 5 and 6.

Figure 5:
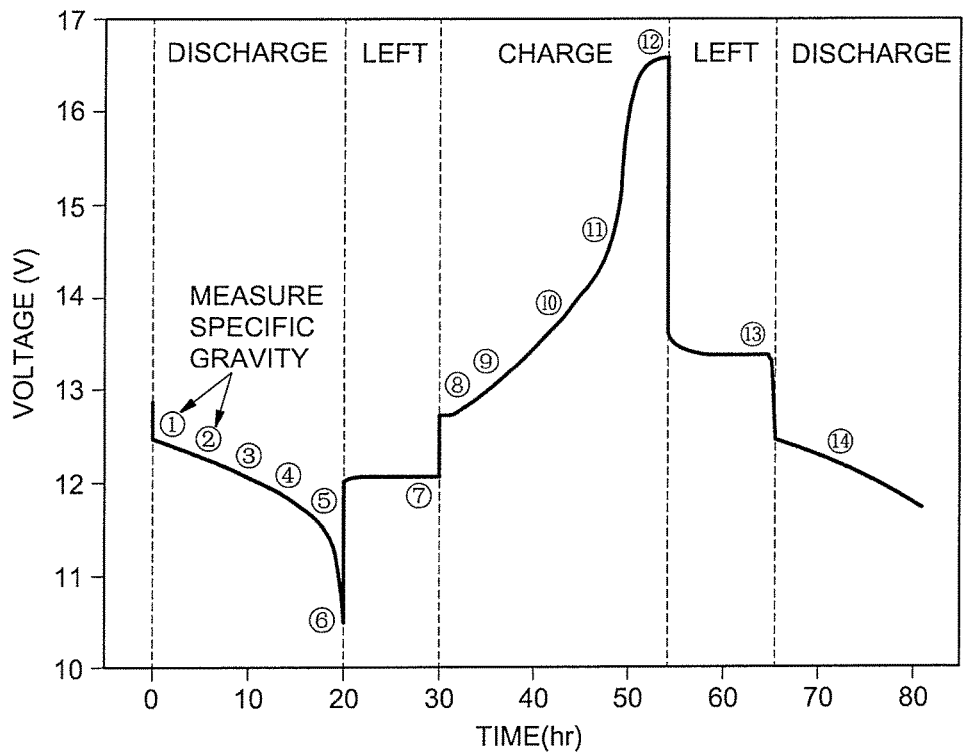
FIG. 5 is a graph illustrating a change in voltage over time after the lead storage battery of Test Example 2 is charged and discharged.

FIG. 5 is a graph illustrating a change in voltage over time after the lead storage battery of Test Example 2 is charged and discharged. The specific gravity of the electrolyte for each charge/discharge step using the measured voltage change in FIG. 5 was measured and the results are illustrated in FIG. 6.

Figure 6:
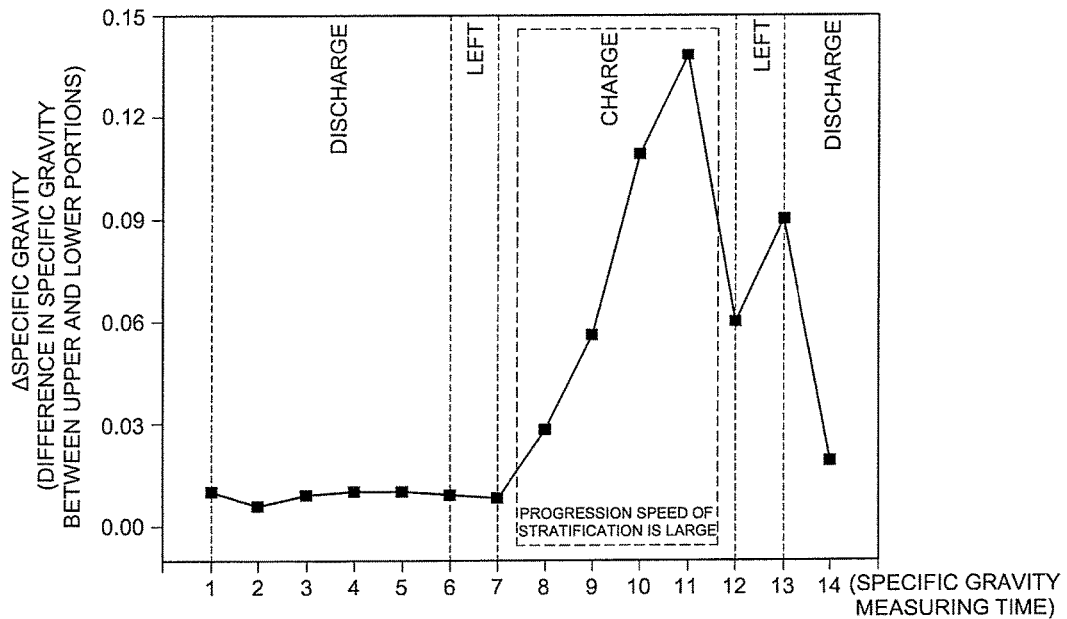
FIG. 6 is a graph illustrating a deviation in specific gravity between upper and lower portions of an electrolyte of the lead storage battery of Test Example 2.

FIG. 6 is a graph illustrating a deviation in specific gravity between the upper and lower portions of an electrolyte of a lead storage battery when charging and discharging as described in Test Example 2. FIG. 6 shows when the lead storage battery was discharged, the deviation in specific gravity between the upper and lower portions of the electrolyte of the battery was small and the degree of stratification was low.

In contrast, it was observed that during charging, the deviation in specific gravity between the upper and lower portions of the electrolyte of the battery was rapidly increased during the charging process. The reason for decrease in the deviation in specific gravity in the late charge stage appears to be that the electrolyte was circulated due to emission of hydrogen ($H_2$) gas as a result of overcharging. The specific gravity increase that occurred during the charging process was decreased again during a continuous discharge process.

Test Example 3: Evaluation of Deviation in Specific Gravity Between Upper and Lower Portions of Electrolyte of Lead Storage Battery as a Function of Dispersant Content and Specific Gravity In order to evaluate a deviation in specific gravity between the upper and lower portions of the electrolyte of the lead storage battery as a function of the dispersant content and specific gravity (a stratification progression index), the electrolyte was prepared by injecting components having the specific gravities and component ratios illustrated in Table 2 below. The dispersant was a mixture of polypropylene and a talc filler in a spherical powder phase having an average particle size of 100 µm.

After manufacturing the lead storage battery by known methods using the prepared electrolyte, 10 charge/discharge cycles were performed, specific gravities of the upper and lower portions of the electrolyte for each cycle were measured and deviations in specific gravity were calculated. The same process was performed using a conventional lead storage battery (Comparative Example). The results are illustrated in Table 3 below and FIG. 7.

In Examples 7 and 8, when dispersants having different specific gravities were mixed and used with a weight ratio of 1:1, the specific gravity of the electrolyte was changed by stratification and thus the low-specific gravity dispersant floating in the electrolyte and the high-specific gravity dispersant settled at the lower portion are complementarily stirred, reducing the deviation in specific gravity between the upper and lower portions of the electrolyte.

Thus, when using a dispersant having a specific gravity of 1.02 to 1.35 alone or using a mixture of two dispersants having different specific gravities in the electrolyte of the lead storage battery, both the deviation in specific gravity between the upper and lower portions of the electrolyte and the degree of stratification were low. As a result, the durability and lifespan of the lead storage battery were improved.

Figure 7:
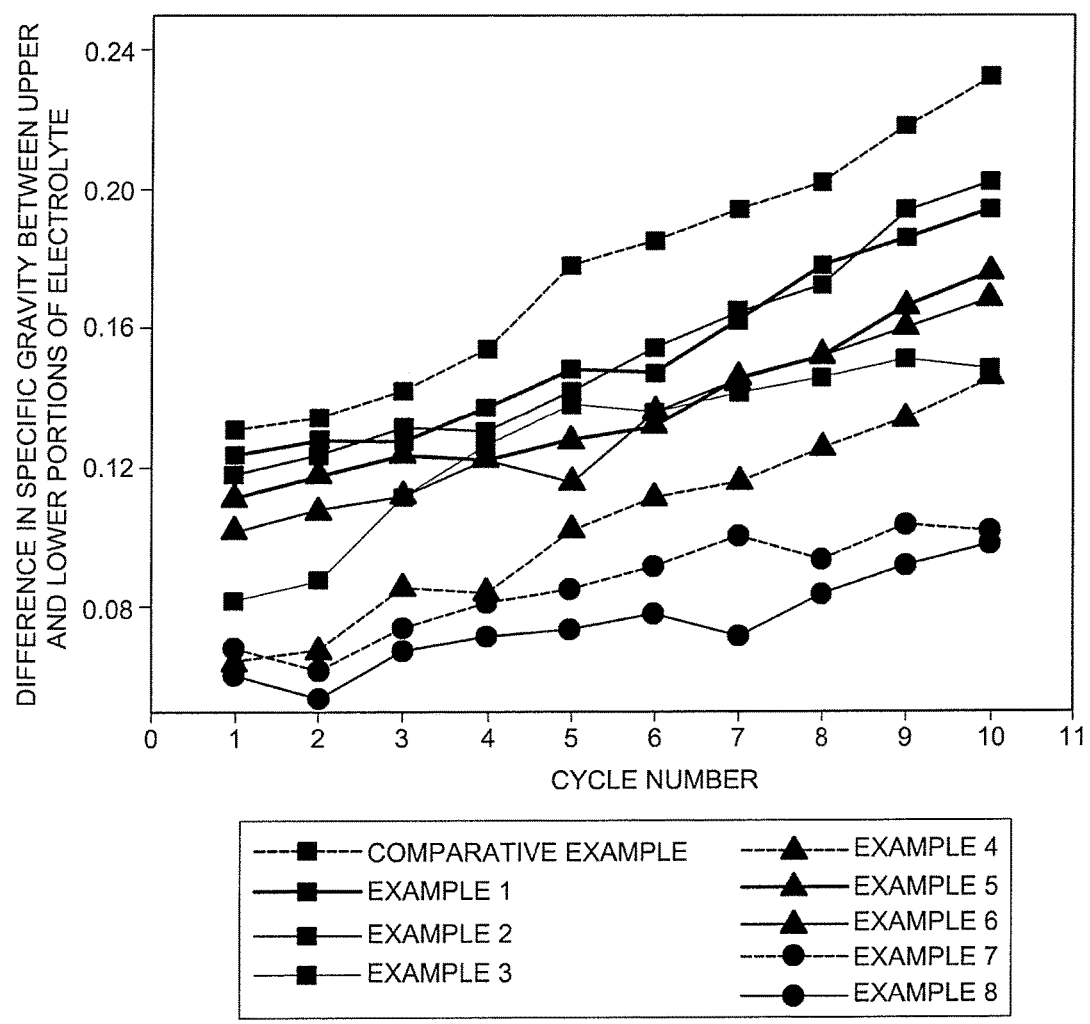
FIG. 7 is a graph illustrating a deviation in specific gravity between the upper and lower portions while charging and discharging the lead storage battery of Test Example 3.

FIG. 7 is a graph illustrating a deviation in specific gravity between upper and lower portions of the electrolyte while charging and discharging of a lead storage battery manufactured by using an electrolyte for a lead storage battery prepared in Test Example 3. As seen in FIG. 7, compared with the Comparative Example, in the case of Examples 1 to 8 where the dispersant is added, the deviation in specific gravity between the upper and lower portions of the elec-

TABLE 2

| Classification | Distilled water | Sulfuric acid ($H_2SO_4$) | Dispersant | | |
|---|---|---|---|---|---|
| (wt %) | | | Content of dispersant | (polypropylene:talc) | Specific gravity of dispersant |
| Comparative Example | 62 | 38 | — | — | — |
| Example 1 | 61.1 | 37.5 | 1.4% | 75:25 | 1.25 |
| Example 2 | 59.5 | 36.2 | 4.3% | 75:25 | 1.25 |
| Example 3 | 61.1 | 37.5 | 1.4% | 73:27 | 1.27 |
| Example 4 | 59.5 | 36.2 | 4.3% | 73:27 | 1.27 |
| Example 5 | 61.1 | 37.5 | 1.4% | 70:30 | 1.30 |
| Example 6 | 59.5 | 36.2 | 4.3% | 70:30 | 1.30 |
| Example 7 | 60.3 | 36.9 | 1.4% + 1.4% | (75:25) + (73:27) | 1.25 + 1.27 |
| Example 8 | 60.3 | 36.9 | 1.4% + 1.4% | (73:27) + (70:30) | 1.27 + 1.30 |

TABLE 3

Deviation in specific gravity between upper and lower portions of electrolyte of lead storage battery

| Classification | 1 cycle | 2 cycle | 3 cycle | 4 cycle | 5 cycle | 6 cycle | 7 cycle | 8 cycle | 9 cycle | 10 cycle |
|---|---|---|---|---|---|---|---|---|---|---|
| Comparative Example | 0.131 | 0.134 | 0.142 | 0.154 | 0.178 | 0.185 | 0.194 | 0.202 | 0.218 | 0.232 |
| Example 1 | 0.124 | 0.128 | 0.127 | 0.137 | 0.148 | 0.147 | 0.162 | 0.178 | 0.186 | 0.194 |
| Example 2 | 0.118 | 0.124 | 0.132 | 0.13 | 0.142 | 0.154 | 0.164 | 0.172 | 0.194 | 0.202 |
| Example 3 | 0.082 | 0.088 | 0.112 | 0.126 | 0.138 | 0.136 | 0.142 | 0.146 | 0.151 | 0.148 |
| Example 4 | 0.064 | 0.068 | 0.086 | 0.084 | 0.102 | 0.112 | 0.116 | 0.126 | 0.134 | 0.146 |
| Example 5 | 0.112 | 0.118 | 0.124 | 0.122 | 0.128 | 0.132 | 0.146 | 0.152 | 0.166 | 0.176 |
| Example 6 | 0.102 | 0.108 | 0.112 | 0.122 | 0.116 | 0.136 | 0.144 | 0.152 | 0.16 | 0.168 |
| Example 7 | 0.068 | 0.062 | 0.074 | 0.082 | 0.086 | 0.092 | 0.101 | 0.094 | 0.104 | 0.102 |
| Example 8 | 0.061 | 0.054 | 0.068 | 0.072 | 0.074 | 0.078 | 0.072 | 0.084 | 0.092 | 0.098 |

As shown in Table 3, in the Comparative Example, as the number of cycles increases, the deviation in specific gravity increases and stratification accelerates.

In contrast, in Examples 1 to 6 in which a dispersant having a specific gravity of 1.25 to 1.30 is used alone, the deviation in specific gravity between the upper and lower portions of the electrolyte decreased compared with the Comparative Example and thus stratification did not accelerate but instead was reduced.

trolyte was relatively low, evidencing a stirring effect resulting from adding the dispersant.

In the case of Examples 7 and 8, the deviation in specific gravity between the upper and lower portions of the electrolyte as function of the number of charge/discharge cycles was lower than in Examples 1 to 6.

Among the Examples, in the case of Example 8, the deviation in specific gravity of the electrolyte is about 2.35 times better than the Comparative Example. As a result, durability was improved by about two times or more compared with a conventional lead storage battery.

Test Example 4-1: SEM of Upper/Lower Surfaces of Electrode Pole Plates in a Lead Storage Battery Using the Electrolytes Prepared in Comparative Example and Examples 7 and 8

The upper and lower surfaces of the electrode pole plates of the lead storage batteries manufactured in Comparative Example and Examples 7 and 8 were examined using scanning electron microscopy (SEM). The result is illustrated in FIG. 8.

Figure 8:
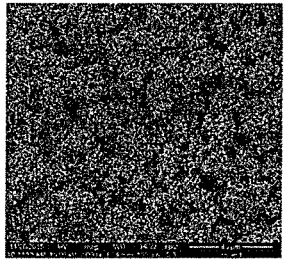
FIG. 8 is a series of SEM photographs of the upper and lower surfaces of a electrode pole plate of the lead storage battery of Comparative Example and Examples 7 and 8 of the present invention.
Figure 8:
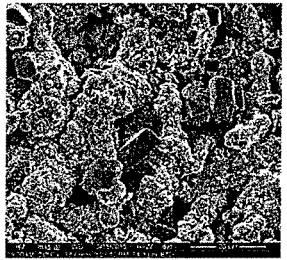
Figure 8:
Figure 8:
Figure 8:
Figure 8:

In FIG. 8, $PbSO_4$ was not detected on the upper surface of the electrode pole plate in the Comparative Example, but a large amount of $PbSO_4$ was present on the lower surface of the pole plate.

In contrast, when comparing the upper and lower surfaces of the electrode pole plate in Examples 7 and 8, $PbSO_4$ was evenly distributed on the upper and lower surfaces of the pole plate. The $PbSO_4$ content on the lower surface of the pole plate in Examples 7 and 8 was significantly lower than in the Comparative Example.

Test Example 4-2: Analysis of Active Material Component ($PbSO_4$) Present on Upper/Lower Surfaces of the Electrode Pole Plate of the Lead Storage Batteries Manufactured by Using Electrolyte Prepared in Comparative Example and Examples 7 and 8

$PbSO_4$ content on the upper and lower surfaces of an electrode pole plate of a lead storage battery manufactured by using the electrolyte prepared in the Comparative Example and Examples 7 and 8 was measured using an X-ray diffraction method. The result is illustrated in Table 4 below.

When the active material $PbSO_4$ is collected and scanned in a range of 20 to 80° by using XRD equipment, a peak curve for components in the active material is obtained and when the corresponding peak area is calculated, a content ratio for the respective components may be calculated. In the present disclosure, all of the values measured by the above method were illustrated.

TABLE 4

| Classification | Comparative Example | Example 7 | Example 8 |
|---|---|---|---|
| Upper portion (wt %) | 18 | 28 | 26 |
| Lower portion (wt %) | 56 | 38 | 34 |
| Content deviation Δ | 38 | 10 | 8 |

As shown in Table 4, in the Comparative Example, the deviation of $PbSO_4$ content between the upper/lower surfaces of the pole plate is very high, and a large amount of $PbSO_4$ is present on the lower surface. The degree of stratification is very large as the deviation in $PbSO_4$ content between the upper/lower surfaces is increased.

In contrast, in the case of Examples 7 and 8, the deviation in $PbSO_4$ content between the upper/lower surfaces of the pole plate is low compared with the Comparative Example and there is no large difference in upper and lower ratios. Particularly, in Example 8, the deviation in $PbSO_4$ content between the upper/lower surfaces of the pole plate was lowest, and thus the degree of stratification is very low.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An electrolyte composition for a lead storage battery comprising:
   distilled water,
   sulfuric acid, and
   a dispersant having a specific gravity of 1.02 to 1.35,
   wherein the dispersant is a mixture of a filler and a polymer resin selected from the group consisting of polypropylene, polyvinyl chloride, and polyethylene, and
   wherein the dispersant mixture has a weight ratio of from about 70% to about 75% polymer resin and from about 25% to about 30% filler.

2. The electrolyte composition of claim 1, wherein the filler is talc, mica, or a mixture thereof.

3. The electrolyte composition of claim 1, wherein the electrolyte composition comprises 30 to 65 wt % of the distilled water, 34.9 to 40 wt % of the sulfuric acid (H2SO4), and 0.1 to 30 wt % of the dispersant.

4. The electrolyte composition of claim 1, wherein the dispersant is formed in a powder shape and has an average particle size of from about 1 μm to about 20 mm.

5. The electrolyte composition of claim 4, wherein the dispersant shape is selected from a group consisting of a spherical shape, a plate-like shape, a cylindrical shape, and a tetrahedral shape.

6. A lead storage battery comprising the electrolyte composition of claim 1.

7. The electrolyte composition of claim 1, wherein the dispersant is a mixture of a first dispersant having a specific gravity of 1.02 to 1.27 and a second dispersant having a specific gravity of 1.271 to 1.35.

* * * * *